United States Patent [19]

Gold

[11] Patent Number: 4,952,801
[45] Date of Patent: Aug. 28, 1990

[54] LOGGING TOOL FOR MEASURING THE MACROSCOPIC THERMAL NEUTRON CAPTURE CROSS SECTION OF BOREHOLE FLUIDS

[75] Inventor: Randy Gold, Houston, Tex.

[73] Assignee: Halliburton Logging Services Inc., Houston, Tex.

[21] Appl. No.: 315,621

[22] Filed: Apr. 11, 1989

[51] Int. Cl.$^5$ ............................ G01V 5/04; G01V 5/10
[52] U.S. Cl. ..................................... 250/269; 250/265; 250/266; 250/270
[58] Field of Search ................. 250/265, 266, 269, 270

[56] References Cited

U.S. PATENT DOCUMENTS

| | | | |
|---|---|---|---|
| 4,028,546 | 6/1977 | Peelman et al. | 250/265 X |
| 4,047,028 | 9/1977 | Arnold | 250/265 X |
| 4,384,205 | 5/1983 | Flaum | 250/269 X |
| 4,500,781 | 2/1985 | Culver et al. | 250/269 |
| 4,760,252 | 7/1988 | Albats et al. | 250/269 |

*Primary Examiner*—Constantine Hannaher
*Assistant Examiner*—Jacob Michael Eisenberg
*Attorney, Agent, or Firm*—William J. Beard

[57] ABSTRACT

For use in a downhole oil well logging tool which is enclosed in a sonde and suspended on an armored logging cable, a means for measuring the macroscopic thermal neutron capture cross section of the borehole fluid is set forth. In the preferred embodiment, a neutron source adjacent to a neutron detector is positioned in a sonde. The entire surrounding region in the well borehole is used as a sample chamber. Fast neutrons from the source after collision with fluid nuclei impinge on the detector which provides an output signal which is indicative of neutron flux. The count rate is most significantly dependent on the thermal neutron capture cross section of the borehole fluid. An additional detector can likewise be spaced farther from the neutron source and provide an alternate count rate. Through the use of two detectors, minor perturbations induced by changes in the environment outside the borehole can be compensated. The neutron capture cross section can be determined for the borehole fluid. Preferably, the sonde is supported for traveling along a cased well on centralizers to control the volume of fluid that is in the immediate vicinity of the neutron source which fluid may be characterized as falling within a test chamber region defined by the case 12.

6 Claims, 1 Drawing Sheet

U.S. Patent
Aug. 28, 1990
4,952,801
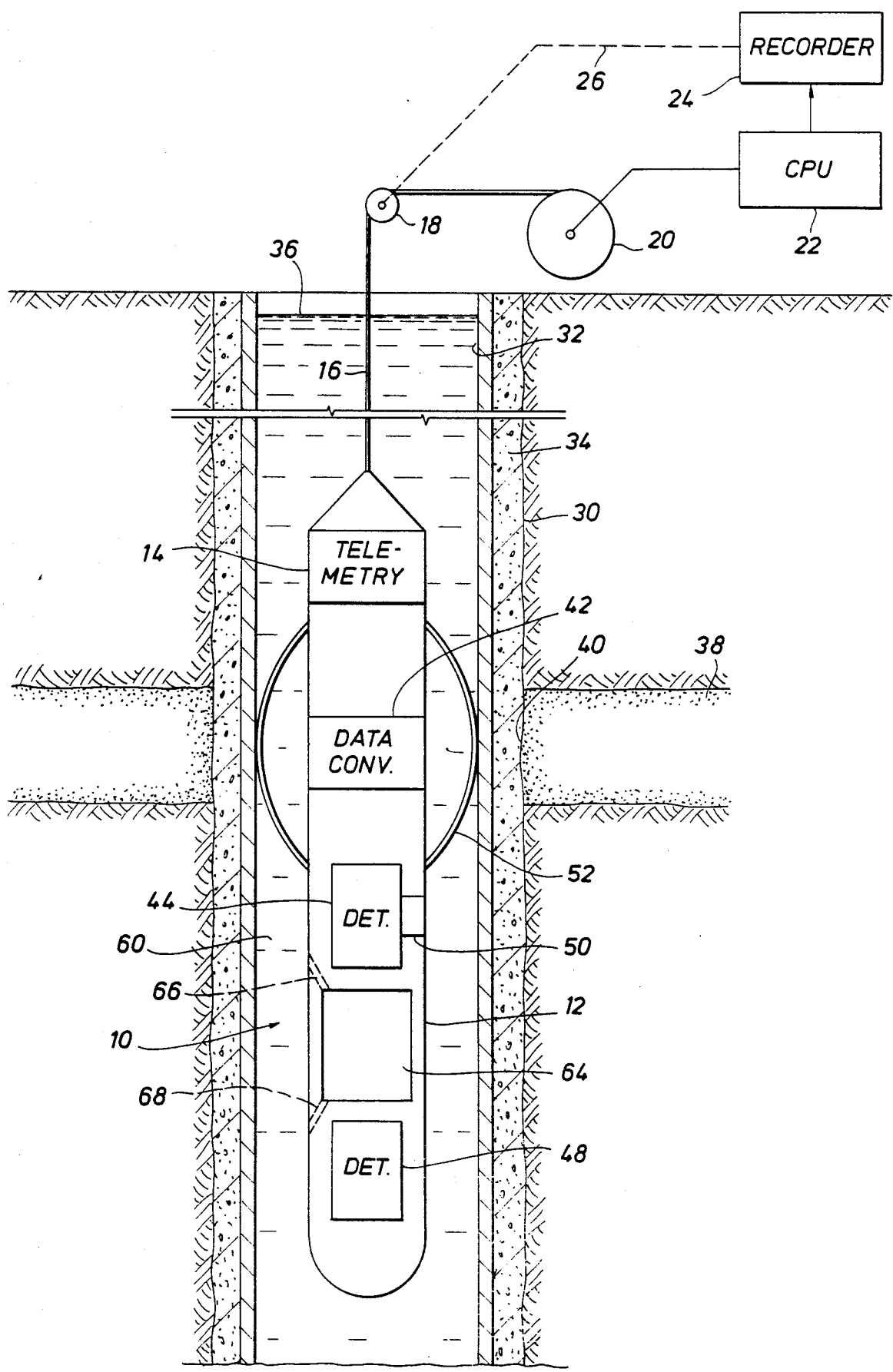

LOGGING TOOL FOR MEASURING THE MACROSCOPIC THERMAL NEUTRON CAPTURE CROSS SECTION OF BOREHOLE FLUIDS

BACKGROUND OF THE DISCLOSURE

In downhole logging operations based on irradiation of the formation with neutrons, log analysis is enhanced by data which deals with the thermal neutron capture cross section measurements of fluids making up the borehole fluid and the surrounding formation. The neutron capture cross section of an element involved in the borehole fluid or surrounding formation is in part dependent on the probabilistic nature and energy of the particles in question as well as the nature of the nucleus of the capture material. For instance, thermal neutron measurements show strong dependence on fluid salinity. The macroscopic thermal neutron capture cross section $\Sigma$ is the effective cross sectional area of a unit volume of material necessary for thermal neutron capture and it involves the volume fraction weighted sum of the probabilities of the various elements which make up the substance within that volume. As a practical matter, $\Sigma$ for the borehole fluid and also for the formation materials can be determined from elemental or neutron analysis of water samples produced from the borehole and the formation.

If formation fluids flow from more than one formation which differ in fluid $\Sigma$, the average fluid at the surface may not yield a meaningful value. But the present system can be used to take data along a well and may well locate a change in $\Sigma$ with changes in formation fluids and thereby locate a specific type of production fluid. Assumptions involved in this measurement are primarily that the production fluids are homogeneous relative to the tested samples, and hence the samples are reliable. Heretofore, measuring tools which have been responsive to borehole fluid have included measuring chambers for holding borehole fluid. One such arrangement is shown in U.S. Pat. No. 4,500,781 where borehole fluid is directed from the borehole into a measurement chamber involving a neutron source at one end and a thermal neutron detector at the opposite end of the chamber. To the extent that a measuring chamber is involved, such a structure uses a fluid flow diverter which diverts continuous fluid flow toward the interior of the tool from the adjacent annular space to assure that the fluid making up the measured sample is consistent with the fluid in the borehole. This typically involves some kind of fluid diverter to assure sample fluid replenishment in the test volume. However, this typically limits a fluid flow velocity and hence limits the velocity of the tool. Always, the measuring chamber will contain less than the total volume in the cased well and that might otherwise be significant to the borehole fluid measurements. To the extent that some of the neutrons are scattered into and return from the surrounding pipe wall, cement and formation, the capture of materials in those adjacent formations attributes some error to the sample volume in the measuring tool. In other words, measurements relating to borehole fluid are in error dependent on the contribution of the capture cross section measurement of surrounding materials making up the pipe, cement, formation, etc. To some extent, $\Sigma$ for the formation results in changing the borehole measurements One purpose of the present disclosure is to set forth a measuring device which has reduced sensitivity to the surrounding environmental structure. The present apparatus is therefore a logging tool which provides a macroscopic thermal neutron capture cross section measurement with markedly reduced error. Moreover, the present system can be used in a single detector mode in instances where environmental impact on the macroscopic thermal neutron capture cross section measurement is small. Where environmental impact is somewhat larger, first and second detectors can be used so that comparisons can be obtained to thereby reduce the impact of the environment outside the casing on the measurements. Further, this is accomplished in a tool which is preferably used in a centralized location in the borehole namely, a tool which is devoid of a sample storage chamber has no flow diverter.

While the foregoing is directed in general to some of the background and describes the present invention, a greater understanding will be obtained upon a review of the below written specification in conjunction with the drawings which follow.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The single drawing shows a macroscopic thermal neutron capture cross section measuring apparatus in a sonde supported in a well for conducting logging operations during retrieval on a logging cable.

DETAILED DESCRIPTION OF THE PREFERRED EMBODIMENT

Attention is directed to the single drawing where the numeral 10 identifies the measuring device constructed in accordance with the present disclosure which is enclosed within a sonde 12 which comprises a closed housing constructed in accordance with industry standards. It is a closed housing for supporting and protecting the equipment on the interior, the equipment comprising a measuring device for making macroscopic thermal neutron capture cross section measurements as a function of depth during the process of logging. Further logging equipment may be located in the sonde 12, and may well make further measurements pertinent to the logging process. However, the present description is directed primarily to the measuring device set forth below, and the present disclosure will be primarily devoted to that aspect of the equipment.

The sonde 12 incorporates a telemetry system 14 which connects with a logging cable 16. The logging cable incorporates one or more conductors therein, and extends from the sonde 12 toward the surface where it passes over a sheave 18. The sheave guides the logging cable to a reel or drum 20 which spools the cable for storage. The cable is provided with one or more enclosed conductors which extend from the telemetry equipment 14 to additional equipment at the surface including a CPU 22 for receiving the data from the logging equipment. The CPU converts the data into a suitable format which is then supplied to a recorder 24. The data which is recorded by the recorder 24 is logged relative to sonde depth, and to this end, a mechanical or electrical depth measuring apparatus 26 provides an indication of the travel of the logging cable 16 so that depth can be known. In typical operation, the sonde is lowered to the bottom of the well borehole and is retrieved, collecting data as it is raised in the well.

The well 30 is typically lined with a casing 32 and it is held in place by a surrounding layer of cement 34. This also prevents artesian water migration along the exterior of the casing. The well typically will be filled with drilling fluid indicated at 36. Drilling fluid is normally made of barite materials in water, and fills the well to a substantial depth so the sonde is operated in the drilling fluid or drilling mud. Alternately, the well may produce a standing column of fluid because production from selected formations flows up the well. Such fluids typically include oil and water, with a varied mix of salt or dissolved minerals. In addition, the well passes through a typical formation at 38, and the formation may have entrained formation fluid therein which is identified by the numeral 40. The formation fluid 40 will be contrasted with the borehole fluid 36 as will be discussed in detail hereinafter.

The sonde incorporates a data conversion circuit at 42 which formats the appropriate data received by the equipment and transfers it to the telemetry circuit. It is included so that output signals from a first detector 44 can be converted into a suitable form. The sonde separately supports a second and spaced detector 48 for purposes to be described. The two detectors cooperate with a suitable neutron source 50, and that will also be described below. The sonde is an enclosed housing which is smaller than the diameter of the casing 32. It is centralized in the preferred mode of operation by a set of centralizer bow springs 52. The springs might be reduced to a single set replaced by some other centralizer, and in some instances, they can be completely omitted. However, it is preferable to obtain centralization of the present apparatus.

One important factor involved in neutron absorption is the impact on neutron flux of the immediate region within the casing near the neutron source 50. This region is generally indicated in the drawings by the numeral 60. It refers to that portion of the borehole fluid in the near vicinity of the neutron source 50 and which provides a certain measure of neutron capture cross section. This region 60 is always in communication with the borehole fluids in the casing in view of the fact that fluid is there to surround the sonde no matter where the sonde is in the cased well. In other words, the irradiation of the surrounding borehole fluid 60 and other materials there beyond which arises from operation of the neutron source is substantially impacted by the capture probability of the nuclei making up the materials of the borehole fluid. There is a lesser impact on the macroscopic neutron capture cross section resulting from the formation materials, but they are more remote from the source 50 and have less impact as will be described below. It is sufficient to note that the region 60 thus serves as a type of sample chamber; there will be fluid motion or movement in this chamber, but it is stationary for all practical purposes in light of the relative speed with which measurements are made in contrast with the relative fluid velocity in the chamber or region 60.

An acceptable neutron source is a chemical neutron generator which provides a neutron flux. One preferred source is a 33 millicurie AmBe neutron source. Alternate chemical sources can likewise be used. The neutrons are emitted from the source 50 and are slowed down primarily by elastic collisions in the fluid in the sample chamber 60. This fluid is borehole fluid or primarily water. Accordingly, the bulk of the elastic collisions occur with the hydrogen nuclei of the water. After collision, a number of thermal neutrons will reach the detector 44. Typically, the detector 44 is constructed and arranged to operate with omnidirectional sensitivity, and one suitable form of detector is a helium −3 ($^3$He) or other thermal neutron detector. If the $\Sigma_b$ of the borehole fluid is relatively small, the number of thermal neutrons impinging on the detector 44 increases and hence, the count rate will be increased. By contrast, if the $\Sigma_b$ of the borehole fluid is higher, more of the neutrons are absorbed by the borehole fluid and fewer are then counted. A relationship between detected thermal neutrons, flux and $\Sigma_b$ fluid is established by calibrating the device with fluids of known $\Sigma$.

While the foregoing speaks of the impact of the $\Sigma_b$ or the macroscopic capture cross section of the borehole fluid, there is also impact from other environmental effects such as the $\Sigma_f$ or the macroscopic neutron capture cross section of the formation. This is in part determined by the geometry. Thus, if the tool is centralized and the casing diameter is quite large, the impact of these surrounding materials is markedly reduced. One of the purposes of the present disclosure is to set forth a measuring system which is less sensitive to formation (environmental) effects $\Sigma_f$ on $\Sigma$ and particularly to describe a system whereby such effects can be compensated. Consider operation of the sonde 10 as shown in the single drawing with the single source and single detector 44. Note further that the detector 44 is located at the same location or position as the neutron source. The source in this configuration was located at the active center of the detector. With the source located at the center of the detector, fast neutrons leaving the source must undergo large angle (∼180°) scattering in order to return to the detector and be counted. The primary scattering nuclei in the downhole environment is hydrogen, and the formation will generally contain much less hydrogen than the borehole fluid. The reduced hydrogen content of the formation with respect to the borehole implies that large angle scattering is less likely in the formation than in the borehole. This means that neutrons that leave the borehole region 60 generally do not return to the detector. Therefore, the thermal flux measured by the detector is less perturbed by the surrounding environment.

Test data for this source and detector geometry shows two noticeable improvements over the measuring over device of U.S. Pat. No. 4,500,781. First, the effects due to decreases in borehole diameter are greatly reduced. Second, changes in $\Sigma_f$ (for a selected casing diameter) had virtually no impact on $\Sigma_b$ where the $\Sigma_b$ is normally large, or greater than about 40 cu. An additional advantage of the coincident spacing of source and detector is an increase in count rate by one or two orders of magnitude. As can be seen, increasing $\Sigma_b$ reduces the count rate because fewer neutrons impinge on the detector 44. In other words, more neutrons are absorbed in the fluid. There is less hydrogen involved in the steel casing and surrounding cement. This reduces the $\Sigma_f$ and more importantly the scattering cross sections of the surrounding structure (casing, cement and formations) and therefore reduces the probability of large angle scattering in that region. Thus, neutrons which escape the borehole are likely not returned to the region of the detector 44. It stands to reason therefore that changes in borehole diameter effect $\Sigma_b$. In other words, a change in borehole diameter has much more impact than change in the surrounding environment. Quite obviously, errors in measurement can be reduced substantially to zero as the borehole diameter increases, and error is likewise reduced as $\Sigma_b$ markedly increases.

If the borehole is quite large or $\Sigma_b$ is relatively large, then minor variations in $\Sigma_b$ resulting from environmental effects can be readily tolerated. Otherwise, some correction must be accomplished and to this end, a second detector 48 is incorporated. This provides a different reading in terms of raw count rate dependent on the relative spacing of the two detectors from the neutron source 50. As always, the detector which is spaced further from the neutron source has a lower count rate. This therefore defines a detector system which has a different sensitivity to $\Sigma_b$ and $\Sigma_f$. It is therefore possible using two detectors to obtain appropriate calibration plots of data from experiments using varied borehole simulations to implement a well known "spine and rib" plot whereby standards for measurement corrections from the detectors can be obtained. This enables compensation to be implemented to remove small environmentally induced errors on the determined $\Sigma_b$. The second detector in the sonde can be used to provide additional data and calibrations so that the impact of $\Sigma_f$ can be isolated and removed.

Once the impact significance of the $\Sigma_f$ has been removed, evaluation of the borehole fluid on the macroscopic thermal neutron capture cross section $\Sigma$ is known. A chamber 64 is located between the two detectors 44 and 48. While it can be empty, it is preferably filled either with a shielding material or borehole fluid 36. The chamber 64 has inlet and outlet lines 66 and 68 which enable filling as required. This varies the neutron flux dependent on the $\Sigma$ of the chamber filling material.

The present apparatus best operates with centralizers on the sonde 10. That however can be altered, through the potential use of appropriate calibration standards for the device in a particular diameter casing.

While the foregoing is directed to the preferred embodiment, the scope thereof is determined by the claims which follow:

What is claimed is:

1. For use in a downhole well logging sonde adapted to be suspended on an armored logging cable in a cased well borehole, a measuring apparatus which comprises:
    (a) a fast neutron source supported by said sonde and adapted to provide a flux of fast neutrons of a selected energy level impinging on borehole fluids in a defined region of the borehole for collision with the element materials thereof;
    (b) thermal neutron detector means supported by said sonde for responding primarily to thermalized neutrons scattered from said source;
    (c) wherein borehole fluids exposed to neutrons from said source and confined in the borehole initiate neutron scattering;
    (d) means for mounting said fast neutron source immediately adjacent to and coincident with said detector means, said source having essentially zero spacing along the sonde supporting said source, and wherein neutrons impinging on said detector means are primarily only those scattered from the borehole fluids; and
    (e) means for centralizing said sonde within the well borehole, and thereby defining in the sonde-casing annulus the borehole fluids in the immediate vicinity of said neutron source.

2. The apparatus of claim 1 including means mounting said source in said sonde adjacent said detector means, and including a second detector means spaced from said detector means.

3. The apparatus of claim 1 wherein said source is a chemical source primarily emitting fast neutrons at energy levels of about 4 Mev.

4. The apparatus of claim 3 wherein said source is AmBe.

5. The apparatus of claim 4 wherein said detector means is a thermal neutron detector including a chamber filled with helium $-3$ ($^3$He).

6. The apparatus of claim 5 including first and second detector means wherein both said detector means include chambers filled with helium $-3$ ($^3$He).

* * * * *